Feb. 28, 1933. W. L. WARD ET AL 1,899,221
NUT FACING MACHINE
Filed Nov. 21, 1931 3 Sheets-Sheet 1
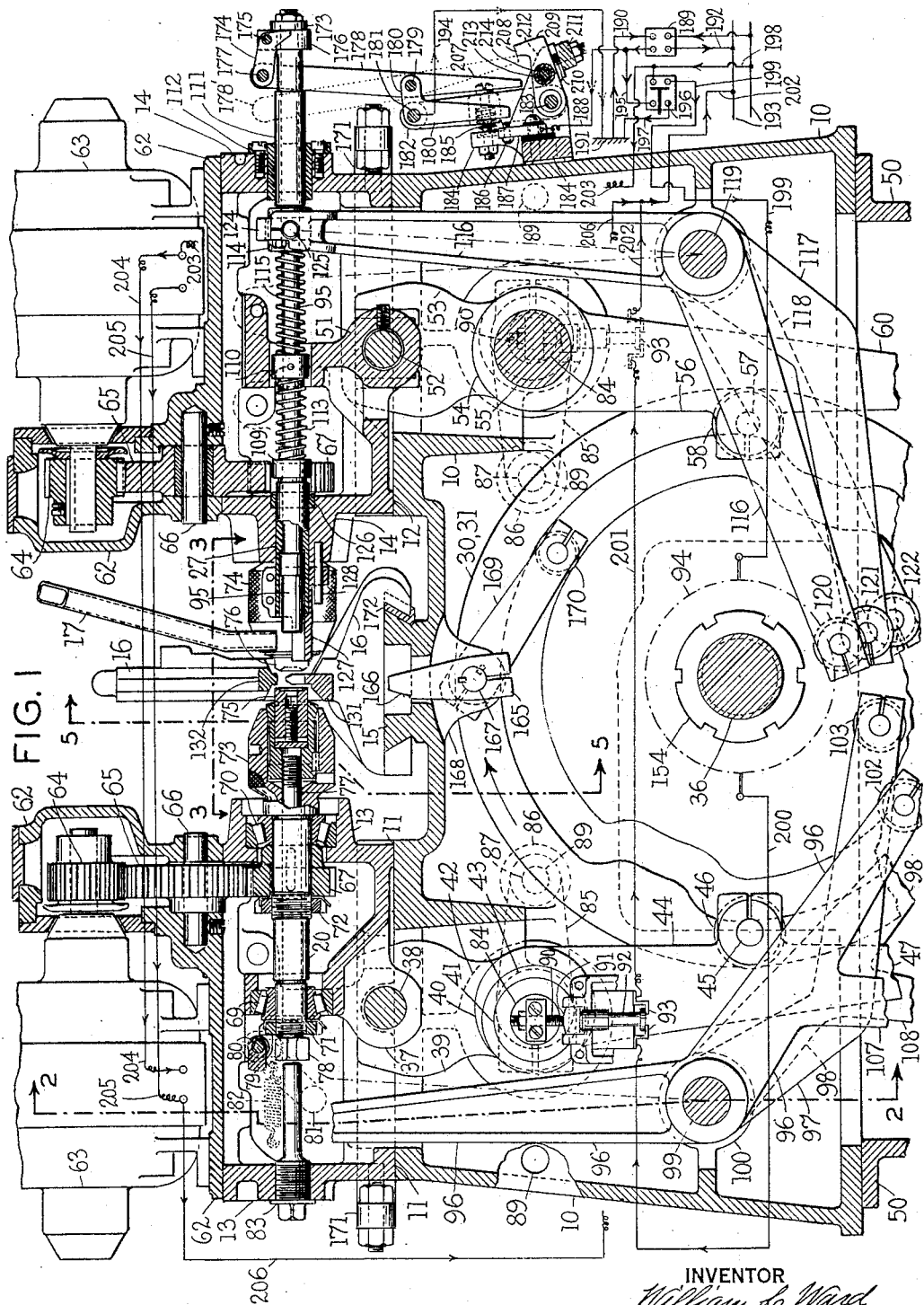
INVENTOR
William L. Ward
BY William D. Rigney
Sydney Prescott
ATTORNEY Feb. 28, 1933.  W. L. WARD ET AL  1,899,221
NUT FACING MACHINE
Filed Nov. 21, 1931  3 Sheets-Sheet 2
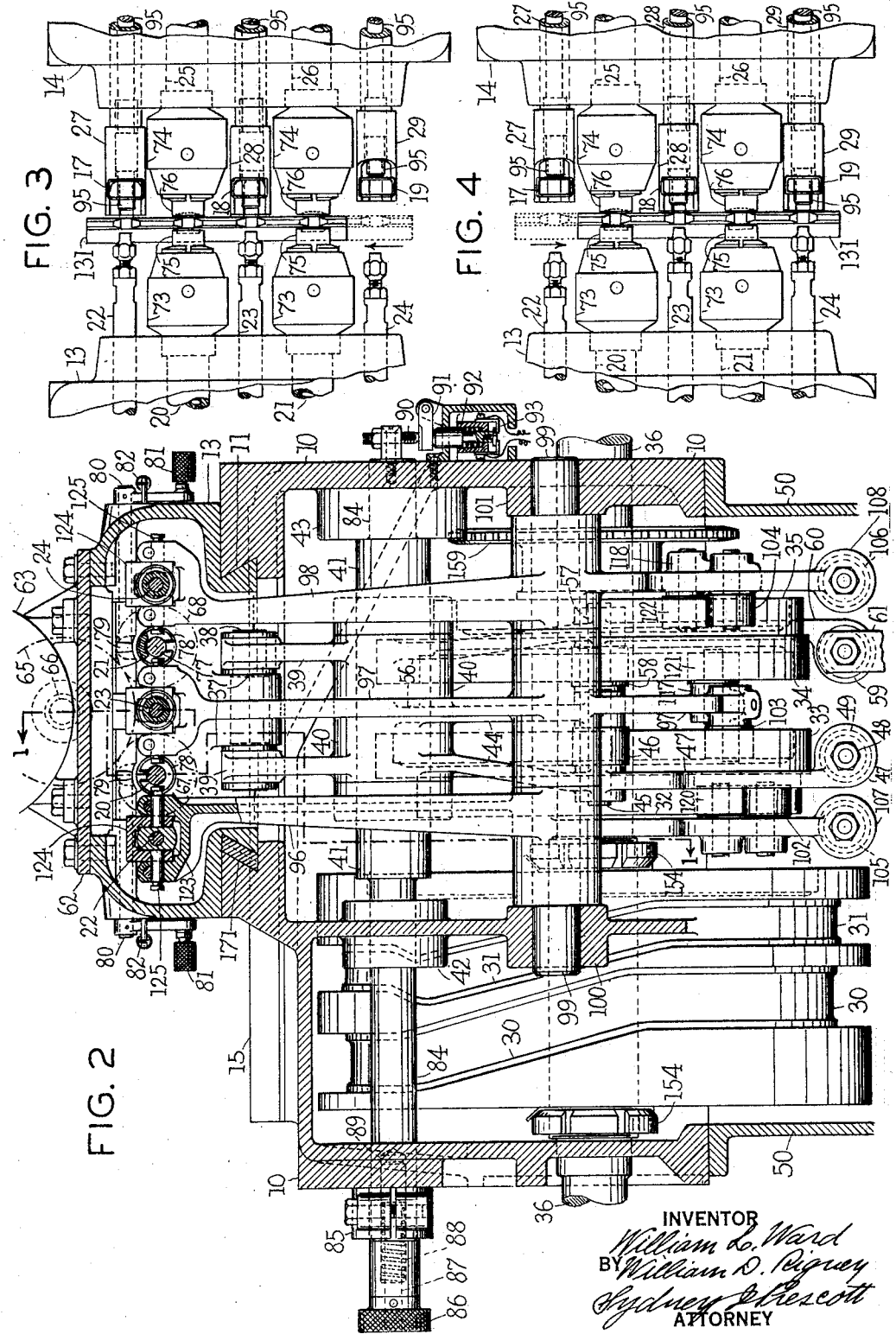

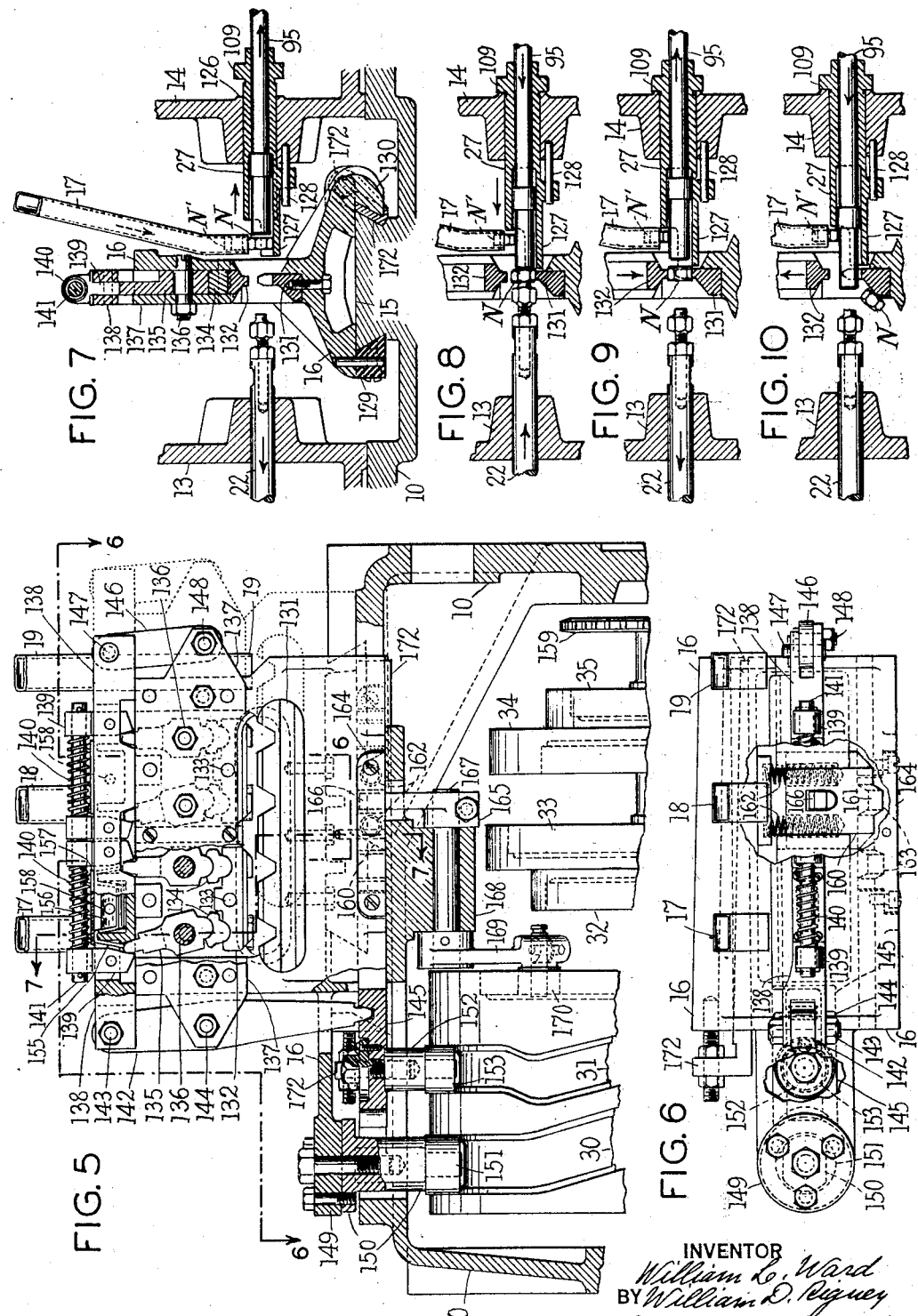

Patented Feb. 28, 1933

1,899,221

UNITED STATES PATENT OFFICE

WILLIAM L. WARD AND WILLIAM D. RIGNEY, OF PORT CHESTER, NEW YORK, ASSIGNORS TO RUSSELL BURDSALL & WARD BOLT & NUT CO., A CORPORATION OF NEW YORK

NUT-FACING MACHINE

Application filed November 21, 1931. Serial No. 576,484.

This invention relates to an improvement in automatic nut-facing machines, its main object being to provide a machine capable of simultaneously finishing both faces of a number of nuts at a high rate of speed, in the order of 300 nuts per minute. With this and other objects not specifically mentioned in view, the invention consists in certain constructions and combinations hereinafter described and then specifically set forth in the claims hereunto appended.

To achieve this object the nuts are fed to a multiple nut-holder slide from a number of chutes, the said holder reciprocating from one position to another, the nuts fed into alternate nut pockets of the holder in the first position being clamped therein and faced by suitable tools in the second position in which the nuts faced in the first position are expelled and their pockets refilled. The nuts fed in this second position are then faced after the nut-holder slide has returned to the first position, and this cycle of operations is continuously repeated. The nuts from the chutes drop into the semi-hexagonal ends of axially slidable horizontal plunger tubes from which, after being moved into position adjacent the nut pockets, they are inserted into the latter by plungers slidable within the said horizontal tubes, the said plungers receding while the nut-holder slide moves to the next position and while the nuts are being faced in that position, and again advancing to expel the nuts after the slide has returned to its first position. When inserting the nuts the feeding plungers push the nuts against adjustable gauge pins advancing at the proper moment from the opposite side of the nut-holder slide, the said gauge pins receding after the nuts have been clamped in position. The holder slide is retained in its two working positions by a suitable lock. The facing-tool chucks are attached to shafts mounted on tool carriages which move towards the nut-holder slide when the latter is in its locked positions and recede from the same when it is moving from one position to another. The motions of the holder slide and its lock, and the plunger tubes, gauge pins, nut-holder clamps, and tool carriages are controlled by cams mounted on a single cam shaft driven by an electric motor.

The tool shafts are rotated by electric motors mounted on the tool carriages, one motor on each carriage being geared to all tool shafts on one side of the nuts. The tool carriage cam levers are mounted on eccentric pivot shafts so that, by turning a handle through 180 degrees, the carriages may be moved back from their working positions for exchange or adjustment of tools. To keep the tool shafts from turning while manipulating the tools, a slotted head is provided at the outer end of each shaft and a latch is pivoted to the frame opposite each tool shaft head, so that by turning the respective handle on the outside of the carriage, each tool shaft can be locked if desired. Safety switches are provided in the circuit supplying the cam shaft motor so that the machine is automatically stopped when any one of the tools is out of place or when one of the nuts is not in its proper position at any time.

In the accompanying drawings, which show one form of the invention as applied to an automatic nut-facing machine arranged for finishing two nuts at each stroke, or four nuts in each revolution, the nuts being fed from three chutes alternately into every other of four nut pockets in the nut-holder slide:

Fig. 1 is a sectional side elevation of the machine, as seen from line 1—1 of Fig. 2;

Fig. 2 is a sectional end elevation of the machine taken on line 2—2 of Fig. 1;

Fig. 3 is a detail top view of the working space, taken on line 3—3 of Fig. 1, showing the nut-holder slide in one of its two end positions;

Fig. 4 is a similar view showing the nut-holder slide in its other extreme position in which the nuts inserted in the first position are tooled and the nuts in the first position are expelled and new nuts inserted;

Fig. 5 is a sectional end elevation of the machine adjacent the nut-holder slide, taken on line 5—5 of Fig. 1;

Fig. 6 is a detail top view of the nut-holder slide from the line 6—6 in Fig. 5;

Fig. 7 is a sectional end elevation of the nut-holder slide, taken on line 7—7 of Fig. 5; and Figs. 8, 9 and 10, are similar views showing the different positions of the nut transferring plungers when inserting a nut into and when expelling the same from the holder clamp.

In carrying the invention into effect there is provided means for simultaneously finishing both faces of a plurality of nuts, a reciprocating nut-holder slide having a plurality of sets of nut pockets, means for clamping nuts in said pockets, means controlling said clamping means to release the nuts in different sets of pockets at the end of each stroke of said slide, means for ejecting the finished nuts from said pockets when they are released and feeding unfinished nuts into the empty pockets, and means for intermittently reciprocating said slide to move the clamped nuts into operative relation with the nut finishing means. In the best forms of construction contemplated, the nut finishing means includes nut finishing tools mounted on tool carriages which are intermittently moved in and out of operative relation to the nuts clamped in the slide, and the clamping means includes a plurality of clamp levers provided with clamp jaws at each end overlying a nut pocket and engaged by toggle blocks actuated by toggle levers which engage in the slots of a reciprocating slide block comprising the controlling means. In the best forms of construction also, the nut feeding means includes plungers adapted to feed the nuts into the pockets, gauge pins to hold the nuts against the plunger in the pockets until they are engaged by the clamping means, and means for moving the gauge pins and plungers toward the slide. The tools in the carriages, which may preferably also be retracted by manually operable means, are preferably driven by motors on the carriages which are stopped when the carriages are retracted by said manually operable means. These various means and parts may be widely varied in construction within the scope of the claims, for the particular machine selected to illustrate the invention is but one of many possible concrete embodiments of the same. The invention, therefore, is not to be restricted to the specific construction shown and described.

Referring to Figs. 1, 2, 3, and 5, the main frame 10 of the machine is provided with longitudinal slideways 11 and 12 on which the tool carriages 13 and 14 move toward and away from each other, and with a transverse slideway 15 on which the nut holder slide 16 moves back and forth in transferring the nut blanks from the feed chutes 17, 18, and 19 to the tooling positions. The tool carriage 13 carries the tool shafts 20 and 21 and the gauge pins 22, 23, and 24, while the carriage 14 carries the tool shafts 25 and 26 and the nut transferring plunger tubes 27, 28, and 29. The movements of the tool carriages and nut-holder slide as well as that of the nut transferring plunger tubes and gauge pins are controlled by cams 30, 31, 32, 33, 34, and 35, all mounted on a single cam shaft 36 supported in bearings of the main frame 10.

Tool carriage 13, in a lug 37, carries a stud 38 on which are pivoted the forks 39 of a lever 40 fulcrumed on a shaft 41 supported in bearings 42 and 43 of frame 10, the arms 44 of lever 40 carrying a stud 45 on which is mounted a cam roller 46. One of the arms 44 has an extension 47 carrying a bolt 48 to which is attached a tension spring 49 anchored to a lug on the sub-frame 50, the spring 49 holding the roller 46 against the surface of cam 33. Tool carriage 14 similarly has a lug 51 carrying a stud 52 on which are pivoted the forks 53 of lever 54 fulcrumed on shaft 55 supported in bearings in the frame 10 and having arms 56 supporting a stud 57 carrying a cam roller 58 which is held against cam 34 by a tension spring 59 stretched between extension 60 of one of the arms 56 and a lug 61 of sub-frame 50.

Each tool carriage has a cover plate 62 on which is mounted an electric motor 63 driving a pinion 64 meshing with an intermediate gear 65 turning on a stud 66 supported in cover plate 62, the gears 65 driving the gears 67 and 68 on the tool shafts 20, 25, and 21, 26, respectively. The tool shafts turn on roller bearings 69 and 70 held in place against shoulders provided in the frames of the carriages 13 and 14 by slot nuts 71 and 72, the latter nut also securing the drive gears 67 and 68 against axial displacement.

The tool shafts are hollow and carry the collet chucks 73 and 74 of known construction, the chucks 73 of carriage 13 having milling cutters 75 suitable shaped for cutting a shoulder and chamfering the thread on one face of the nut, and the chucks 74 of the carriage 14 have milling cutters 76 for rounding the other face and chamfering the thread on that face. The cutters 75 and 76 are clamped in the collets of the chucks by means of shafts 77 threaded into the inner ends of the collets and extending all the way through the hollow shafts 20, 21, 25, and 26, and having a slotted head 78 at their outer ends. By turning the shaft 77 the collets are drawn into the chucks to clamp the cutters, turning of the collets being prevented by a suitable key on the interior of the chucks engaging a slot in the collets, as shown in Fig. 1. The cutters have stops threaded into their inner ends and engaging washers positioned between the inner ends of the cutters and a shoulder in the collets. By adjusting these stops the depth of cut may be regulated. Latches 79 mounted on studs 80 which are turnable by handles 81 held in their open position by tension springs 82, engage with the slots in heads 78 when the handles are depressed, to prevent turning of shafts 77 while adjusting the respective cutter. Pins 83, inserted concentrically with each sleeve into the tool carriages and extending within close proximity to the heads 78, serve as stops for the shafts 77 when the tools are adjusted with the chucks open.

The fulcrum shafts 41 and 55 of the tool-carriage actuating levers 40 and 54 have eccentric trunnions 84, one trunnion of each shaft being extended through the frame 10 and provided with a handle 85, the knob 86 of which carries a pin 87 pressed by a spring 88 into either of two holes 89 in the frame 10. By lifting the pin out of the inner of these holes, in which position of the handle the tool is in its working position, and turning the handle through 180 degrees, the respective tool carriage can be moved a sufficient distance from its working position to permit manipulation of the tool for removal or insertion. The opposite trunnion of each fulcrum shaft is provided with a radially extending screw 90 resting on a lever 91 which depresses a push button 92 closing contacts 93 in the electric circuit supplying the motor 94 driving cam shaft 36. When either of the handles 85 is turned to its "out" position, the screw 90 leaves the lever 91, thus releasing the push button 92 and breaking the contact at 93, thereby opening the circuit of motor 94 which drives cam shaft 36, and stopping the cam shaft 36 so that it cannot be restarted until both tool carriages are again in working position.

Halfway between the sleeves on each carriage and at equal distances at the outer sides thereof, carriage 13 carries three axially slidable gauge pins 22, 23, and 24, and carriage 14 carries three axially slidable plunger tubes 27, 28, and 29, each plunger tube carrying a slidable plunger 95. The gauge pins 22, 23, and 24 are actuated by levers 96, 97, and 98 which are fulcrumed on a shaft 99 supported in bearings 100 and 101 of frame 10 and have cam rollers 102, 103, and 104 engaging with the cams 32, 33, and 35 respectively, the rollers 102 and 104 being held against the peripheries of their respective cams by tension springs 105 and 106 attached to extension arms 107 and 108 of their levers and anchored on the sub-frame 50, while the roller 103 runs in a face track of cam 33.

The plungers 95 are loosely mounted in the plunger tubes 27, 28, and 29 and project from them all the way through and past the end wall of carriage 14. Some distance from the end flanges 109 of the tubes, the plungers 95 have a fixed collar 110 and at their protruding ends they are slidably supported by a flanged sleeve 111 sliding in bushings 112 mounted in the end wall of carriage 14. Between the end flange 109 of each plunger tube and the collar 110 of each plunger is placed a coil spring 113, and between the collar 110 of each plunger and the flange 114 of each sleeve 111 is placed a coil spring 115. The plunger tubes 27, 28, and 29, through their respective plungers and springs, are actuated by bell crank levers 116, 117, and 118 fulcrumed on a shaft 119 and having cam rollers 120, 121, and 122 engaging with the face tracks of cams 32, 34, and 35.

Near their outer ends at which they are slidably supported in bushings fastened in the end wall of carriage 13, similar to the bushings 112 in carriage 14, each of the gauge pins 22, 23, and 24 has a flange 123 similar to the head flange 114 of sleeves 111. These flanges 123 as well as the head flanges 114 are provided with a vertical slot at each side, in which slots are fitted yokes 124 having trunnions 125 pivoted in the forked ends of levers 96, 97, 98, 116, 117, and 118, the yokes 124 sliding up and down in the slots of the flanges 114 and 123 as the pins or plungers are moved back and forth by their respective actuating levers. The springs 113 on the plungers 95 are weaker than the springs 115 so that, when the sleeves 111 are moved inward, the plunger tubes 27, 28, and 29 move with the plungers 95 until their end flanges 109 are arrested by projections 126 on the inner faces of the plunger tube bearings of carriage 14, whereupon the plungers advance alone. Integral with the inner end of each tube is a semi-hexagonal cradle 127 for the reception of the nuts from the feed chutes 17, 18, and 19 which are placed at equal horizontal distances from the centers of the sleeves 25 and 26. These cradles are held in radial alignment by sliding on pins 128 inserted into the face of carriage 14.

The nut-holder slide, Figs. 5, 6, 7, consists of a slidable frame 16 held by jaws 129 and 130 on the slideway 15 of frame 10, the slide 16 carrying a bar 131 having four semi-hexagonal nut pockets with each of which is associated a clamping device for rigidly holding the nut while being faced. These clamping devices are so co-related that the clamps of the first and third pocket, which may be considered to form one set of pockets, are open when those of the second and fourth pocket, which may be considered to form the other set, are closed, and vice versa. For this purpose, a clamp lever 132 having a clamp jaw at the under side of each end, is pivoted on a stud 133 over each two adjoining nut pockets, this lever carrying, in a semi-cylindrical depression in the upper side of each end, a loose toggle block 134 with a half round depression in which engages the semi-cylindrical end of a toggle lever 135 pivoted on a stud 136, the blocks 134 being held in place by a plate 137 attached to slide 16. The upper ends of the toggle levers 135 are tooth-shaped and are resiliently held in slots of a slide block 138, one wall of each slot being formed by a slot lever 139 pivoted in the slide block and forced against the tooth of the toggle lever by one of two strong compression springs 140 held between each two adjoining slot levers by a pin 141 extending through all four levers. The slide block 138 is actuated by a lever 142 attached to one end of it by a stud 143 and pivoted on a stud 144 in the plate 137, the lever 142 at its lower end terminating in a tooth engaging with a slot in a slide block 145 guided by a slideway on main frame 10 of the machine. The other end of slide block 138 is guided by a link 146 attached to it by a stud 147 and pivoted on a stud 148 in plate 137.

A lug 149 extending from the base of slide frame 16 carries a flattened vertical stud 150 guided in a slot of frame 10, the stud 150 having a roller 151 engaging with the cam track 30 of a drum cam on shaft 36. To the block 145 is fastened a vertical stud 152 which carries a roller 153 engaging with the cam track 31 of the drum cam. The drum cam having cam tracks 30 and 31 is secured on a threaded portion of shaft 36 by means of slot nuts 154, enabling the cams to be accurately adjusted axially for proper registration of the nut holder pockets with the inserting plungers and feed chutes.

The tooth contacts of toggle levers 135 are lubricated by wicks 155 depending from oil pockets 156 of block 138, the pockets 156 having covers 157 and being supplied through inlets 158 from an oil pump, not shown, driven by a sprocket 159 on cam shaft 36, the said oil pump also supplying lubrication for other bearings.

In its two working positions, as illustrated in Fig. 5, one of which is shown by full lines and the other by dotted lines, the nut-holder slide 16 is locked by a transverse slide 160 having a tooth 161 held by springs 162 in one of two slots 163 provided in a block 164 inserted into slide jaw 129 (Fig. 7) of frame 16. The lock slide 160 is moved to and from the lock block 164 at the proper moment by a lever 165 having a tooth 166 engaging with a slot in slide 160. The lever 165 is affixed to a stud 167 supported in a lug 168 of frame 10 and having at its other end a cam lever 169 carrying a cam roller 170 running in a face track of drum cam 30, 31.

The tool carriages 13 and 14 and the nut-holder slide 16 are provided with adjustable wedge-shaped gibs 171 and 172, respectively, for taking up the wear of the sliding surfaces.

At each stroke of the machine, or twice in each revolution of cam shaft 36, the nut-holder slide 16 moves from the position shown in Fig. 3 to that shown in Fig. 4, the nuts inserted into the first and third pocket of bar 131 in the first position being tooled in the second position, while the nuts tooled in the first position are expelled from the second and fourth pocket of the nut holder and replaced by new nuts. Thus, as the slide moves back and forth, two nuts are first transferred from chutes 17 and 18 by the plungers 27 and 28, then two nuts are taken from chutes 18 and 19 by the plungers 28 and 29, then the first two nuts are expelled and new ones inserted from chutes 17 and 18 by plungers 27 and 28, then the second two nuts are expelled and new ones inserted from chutes 18 and 19 by plungers 28 and 29, and so on, the middle chute 18 supplying twice as many nuts as each of the two outer chutes 17 and 19.

The operation of the nut transferring parts for one of the holder pockets is shown in Figs. 7 to 10. After the plunger tube and plunger have receded upon expelling a finished nut from one of the pockets of holder back 131, a new nut N drops into the cradle end 127 of the tube, Fig. 7. Tube 127 and plunger 95 then move inward, thereby carrying the nut N into the empty pocket of bar 131, the gauge pin (22) advancing from the other side to stop the nut from going too far, Fig. 8. As the plunger 95 advances with the nut N, the next nut N' in the chute (17) drops and is held in the mouth of the chute by resting on the plunger. The clamp jaw 132 of the pocket then closes, thereby holding the nut N tight while the slide 16 moves into the tooling position and while the nut is being faced, and the plunger and gauge pin recede, Fig. 9. Upon returning to the loading position, Fig. 10, the clamp 132 opens and the nut N is expelled by the advance of plunger 95. Therefore, when the plunger again recedes, the nut N' drops into the cradle 127 as in Fig. 7, and the operation is repeated.

In order to avoid trouble in case a nut should fall face down into one of the cradles 127, or anything else should happen which prevents one of the plungers 95 from completing its inserting stroke, the outer end of each plunger is provided with a stop 173 against which rests the nose of an arm 174 pivoted on a stud 175 carried by a collar 176 clamped in touch with stop 173 onto the end of plunger supporting sleeve 111. From a stud 177 in the end of arm 174 depends a link 178 attached by a stud 179 to a bell-crank lever 180 pivoted on a stud 181 carried by a link 182 pivoted on a stud 183 in a bracket 184 attached to frame 10, the link 182 being held to bracket 184 by a spring 185. The free end of each lever 180 registers with one of three screws 186 in an insulated bar 187 but remains out of contact with the same as long as a collar 176 remains in touch with stop 173. When one of the plungers is stopped by an obstruction while its operating lever 116, 117 or 118 performs its forward stroke, the sleeve 111 advances against spring 115, thereby establishing a space between collar 176 and stop 173 and thus permitting the arm 174 to turn on stud 175, thereby, through link 178, turning the lever 180 which thus comes in contact with screw 186.

The insulated bar 187 is connected by a wire 188 to the secondary of a transformer 189 of usual construction, the other terminal of which, by a wire 190, is in communication with a ground connection 191, the primary of transformer 189 being supplied with current through wires 192 from supply circuit 193. The stud 181, on which turns the contact lever 180, is connected by a wire 194 to ground connection 191. From wire 188 a wire 195 leads to the actuating coil of a relay 196 of usual construction, the other terminal of which is connected to ground connection 191 by a wire 197. The secondary circuit of relay 196, through wires 198 and 199, supplies the cam shaft motor 94 the current which returns to circuit 193 by wires 200, 201, and 202 through the push button switches 93 above described. A branch 203 from wire 198 feeds the tool motors 63, the latter being connected in parallel by wires 204 and 205, the current from motors 63 returning to circuit 193 through wires 206 and 202. When one of the contacts between levers 180 and screws 186 on bar 187 is closed in case of an accident, the current from the secondary of transformer 189 is shunted through bar 187 to ground 191 instead of flowing through the primary of relay 196, thereby opening the secondary relay circuit and stopping the motor 94.

In order to insure perfect alignment of the nuts in holder slide 16 the plunger operating levers 116, 117 and 118 are set to over-travel the nut inserting stroke by a small distance, thus causing the springs 115 to press the nuts tightly against the gauge pins 22, 23, and 24 while the holding clamps are forced down on the newly inserted nuts. During this over-travel, there is a corresponding space between collar 176 and stop 173 which would cause a motor-stopping contact at the screws 186 if the link 178 were allowed to descend during this time. To prevent this contact from being established, each link 178 is provided with an extension 207, the end of which, at the moment of over-travel when the link 178 is in the dotted position 178' shown in Fig. 1, comes to rest on the nose 208 of a lever 209 and rides on this nose during the added tightening motion of the operating levers. The levers 209, for exact adjustment of their noses with the extensions 207, are eccentrically mounted on the pivot studs 183 of links 182 and rest on set screws 210 carried by a bar 211 attached to ribs 212 of bracket 184. The three levers 209, after adjustment, are tied to bracket 184 by tightening the nuts on a tie rod 213 which passes freely through the ribs 212 and has spacing sleeves 214 between the individual levers and the said ribs.

The spring 185 serves as a safeguard in case one of the noses 208 is out of adjustment so that the corresponding extension 207 is arrested instead of supported by it, the link 182 then turning on pivot 183 and bringing lever 180 into contact with screw 186, thereby stopping motor 94.

The motors 63 being directly connected to main supply circuit 193, without passing through the secondary circuit of relay 196, the tools keep on rotating until their supply current is broken by a switch placed in one of the wires 203 or 206, or until the supply to wires 198 and 202 is interrupted by a switch in the main supply circuit.

What is claimed is:

1. In a nut-facing machine, the combination with means for simultaneously finishing both faces of a plurality of nuts, of an intermittently reciprocating nut-holder slide having a plurality of sets of nut pockets, means for clamping nuts in said pockets, means controlling said clamping means to release the nuts in different sets of pockets at the end of each stroke of said slide, means for ejecting the finished nuts from said pockets when they are released and feeding unfinished nuts into the empty pockets, and means for intermittently reciprocating said slide to move the clamped nuts into operative relation with said nut finishing means.

2. In a nut-facing machine, the combination with means for simultaneously finishing both faces of a plurality of nuts, of an intermittently reciprocating nut-holder slide having a plurality of sets of nut pockets, means for clamping nuts in said pockets, means controlling said clamping means to release the nuts in different sets of pockets at the end of each stroke of said slide, means for ejecting the finished nuts from said pockets when they are released and feeding unfinished nuts into the empty pockets, and means for intermittently reciprocating said slide to move the clamped nuts into operative relation with said nut finishing means, said nut finishing means including tool carriages arranged on opposite sides of said slide, nut finishing tools rotatably mounted on said carriages, means for rotating said tools, and means for intermittently moving said carriages toward said slide to bring said tools into operative relation to the nuts clamped in said slide.

3. In a nut-facing machine, the combination with means for simultaneously finishing both faces of a plurality of nuts, of an intermittently reciprocating nut-holder slide having a plurality of sets of nut pockets, means for clamping nuts in said pockets, means controlling said clamping means to release the nuts in different sets of pockets at the end of each stroke of said slide, means for ejecting the finished nuts from said pockets when they are released and feeding unfinished nuts into the empty pockets, means for intermittently reciprocating said slide to move the clamped nuts into operative relation with said nut finishing means, and means for locking said slide when the nuts are in operative relation to said nut-finishing means.

4. In a nut-facing machine, the combination with means for simultaneously finishing both faces of a plurality of nuts, of an intermittently reciprocating nut-holder slide having a plurality of sets of nut pockets, means for clamping nuts in said pockets, means controlling said clamping means to release the nuts in different sets of pockets at the end of each stroke of said slide, means for ejecting the finished nuts from said pockets when they are rleased and feeding unfinished nuts into the empty pockets, and means for intermittently reciprocating said slide to move the clamped nuts into operative relation with said nut finishing means, said clamping means including a plurality of clamp levers pivoted on said slide and provided with a clamp jaw at each end overlying a nut pocket in said slide, toggle blocks engaging each end of said lever, and toggle levers pivoted on said slide and fitted into said blocks to swing either end of the clamp levers and the jaws thereon into clamping position.

5. In a nut-facing machine, the combination with means for simultaneously finishing both faces of a plurality of nuts, of an intermittently reciprocating nut-holder slide having a plurality of sets of nut pockets, means for clamping nuts in said pockets, means controlling said clamping means to release the nuts in different sets of pockets at the end of each stroke of said slide, means for ejecting the finished nuts from said pockets when they are released and feeding unfinished nuts into the empty pockets, and means for intermittently reciprocating said slide to move the clamped nuts into operative relation with said nut finishing means, said clamping means including clamp jaws overlying said pockets, and toggle levers connected to said jaws, and said controlling means including a slide block provided with a plurality of slots receiving the upper ends of said toggle levers, and means for reciprocating said slide block to cause said jaws to clamp and release the nuts in said pockets.

6. In a nut-facing machine, the combination with means for simultaneously finishing both faces of a plurality of nuts, of an intermittently reciprocating nut-holder slide having a plurality of sets of nut pockets, means for clamping nuts in said pockets, means controlling said clamping means to release the nuts in different sets of pockets at the end of each stroke of said slide, means for ejecting the finished nuts from said pockets when they are released and feeding unfinished nuts into the empty pockets, and means for intermittently reciprocating said slide to move the clamped nuts into operative relation with said nut finishing means, said nut feeding means including a plurality of cradles, feed chutes arranged to deliver nuts to said cradles, plunger tubes carrying said cradles, plungers in each of said tubes adapted to engage the nuts in said cradles and yieldable means for moving said tubes and plungers toward said slide to bring said cradles into juxtaposition with said pockets when the nuts clamped therein are released and eject the finished nuts from said pockets and insert unfinished nuts therein.

7. In a nut-facing machine, the combination with means for simultaneously finishing both faces of a plurality of nuts of an intermittently reciprocating nut-holder slide having a plurality of sets of nut pockets, means for clamping nuts in said pockets, means controlling said clamping means to release the nuts in different sets of pockets at the end of each stroke of said slide, means for ejecting the finished nuts from said pockets when they are released and feeding unfinished nuts into the empty pockets, and means for intermittently reciprocating said slide to move the clamped nuts into operative relation with said nut finishing means, said nut feeding means including gauge pins on one side of said slide, plungers on the other side of said slide adapted to feed nuts into the empty pockets thereof, means for actuating said plungers to feed nuts into the empty pockets, and means for actuating said pins to hold the nuts in the pockets against said plungers until the nuts are engaged by said clamping means.

8. In a nut facing machine, the combination with means for simultaneously finishing both faces of a plurality of nuts, of an intermittently reciprocating nut-holder slide having a plurality of sets of nut pockets, means for clamping nuts in said pockets, means controlling said clamping means to release the nuts in different sets of pockets at the end of each stroke of said slide, means for ejecting the finished nuts from said pockets when they are released and feeding unfinished nuts into the empty pockets, and means for intermittently reciprocating said slide to move the clamped nuts in operative relation with said nut finishing means, said slide also having a lug extending therefrom and said means for reciprocating said slide including a cam and a stud secured to said lug and provided with a cam roller engaging said cam.

9. In a nut-facing machine, the combination with means for simultaneously finishing both faces of a plurality of nuts of an intermittently reciprocating nut-holder slide having a plurality of sets of nut pockets, means for clamping nuts in said pockets, means controlling said clamping means to release the nuts in different sets of pockets at the end of each stroke of said slide, means for ejecting the finished nuts from said pockets when they are released and feeding unfinished nuts into the empty pockets, and means for intermittently reciprocating said slide to move the clamped nuts into operative relation with said nut finishing means, said nut-finishing means including tool carriages mounted on opposite sides of said slide, a plurality of tool shafts rotatably mounted in said carriages, nut finishing tools carried by each of said shafts, a motor on each carriage geared to the tool shafts, automatic means for moving said carriages to bring said tools in and out of operative relation to the nuts clamped in said slide, manually operable means for retracting said carriages from said slide to permit removal and replacement of said tools, and means controlled by said manually operable means to stop said motors when said carriages are retracted by said manually operable means.

10. The combination with an intermittently reciprocating nut-holder slide having a plurality of sets of nut pockets, of means for clamping nuts in said pockets, means controlling said clamping means to release the nuts in different sets of pockets at the end of each stroke of said slide, means for ejecting the nuts from said pockets when they are released and feeding nuts into the empty pockets, and means for intermittently reciprocating said slide.

11. The combination with an intermittently reciprocating nut-holder slide, of means for reciprocating said nut-holder slide operating to intermittently stop it at the end of each stroke and means for locking said nut-holder slide when it is stopped, said locking means including a block mounted on said nut-holder slide and having a pair of slots, a slidably mounted lock slide, and means for moving said lock slide into one of said slots when said nut-holder slide is stopped at the end of each stroke.

12. The combination with a nut-holder slide having a plurality of nut pockets, of means for clamping nuts in said pockets and means controlling said clamping means to release the nuts, said clamping means including a plurality of clamp levers pivoted on said slide and provided with a clamp jaw at each end overlying a nut pocket, toggle blocks engaging each of said levers, and toggle levers pivoted on said slide and fitted into said blocks to swing either end of said clamp levers and the jaws thereon into clamping position.

13. The combination with a nut-holder slide having a plurality of nut pockets, of means for clamping nuts in said pockets, and means controlling said clamping means to release the nuts, said clamping means including clamp jaws overlying said pockets, and toggle levers connected to said jaws, and said controlling means including a slide block provided with a plurality of slots receiving the upper ends of said toggle levers for reciprocating said slide blocks to cause said jaws to clamp and release the nuts in said pockets.

14. The combination with a nut-holder slide having a plurality of nut pockets, of means for clamping nuts in said pockets, said means including a plurality of clamp levers pivoted on said slide and provided with a clamp jaw at each end overlying a nut pocket, toggle blocks engaging each end of said lever, and toggle levers pivoted on said slide and fitted into said blocks to swing either end of said clamp levers and the jaws thereon into clamping position.

15. The combination with a nut-holder slide having a plurality of nut pockets, of means for feeding nuts into said pockets, and means for clamping the nuts in said pockets, said feeding means including a plurality of cradles, feed chutes arranged to deliver nuts to said cradles, plunger tubes carrying said cradles, plungers in each of said tubes adapted to engage the nuts in said cradles, and yieldable means for moving said tubes and plungers toward said slide to bring said cradles into juxtaposition with said pockets and cause the plungers to insert nuts therein.

16. The combination with a nut-holder slide having a plurality of nut pockets, of means for feeding nuts into said pockets, and means for clamping the nuts in said pockets, said feeding means including gauge pins on one side of said slide, plungers on the other side of said slide adapted to feed nuts into said nut pockets, means for actuating said plungers to feed nuts into said pockets, and means for actuating said pins to hold the nuts in said pockets against said plungers until they are engaged by said clamping means.

17. The combination with a nut-holder slide having a plurality of nut pockets, of means for feeding nuts into said pockets, means for clamping nuts in said pockets, and means for finishing nuts clamped in said pockets, said nut-finishing means including tool carriages arranged on opposite sides of said slide, nut-finishing tools mounted in said carriages, and means for moving said carriages toward said slide to bring said tools into operative relation with the clamped nuts, and said feeding means including plungers mounted in said carriages and adapted to insert nuts into said pockets, yieldable means for moving said plungers to insert the nuts in said pockets, and means for stopping the movement of said carriages when said plungers are prevented from completing their inserting stroke.

18. Means for simultaneously finishing both faces of a plurality of nuts, comprising a plurality of oppositely disposed tool carriages, a plurality of tool shafts rotatably mounted in said carriages, nut finishing tools carried by each of said shafts, a motor on each carriage geared to the tool shafts, automatic means for moving said carriages in and out of working position, manually operable means for retracting said carriages from working position to permit removal and replacement of said tools, and means controlled by said manually operable means to stop said motors when said carriages are retracted by said manually operable means.

In testimony whereof, we have signed our names to this specification.

WILLIAM L. WARD.
WILLIAM D. RIGNEY.